US012746817B2

(12) United States Patent
Shinohara

(10) Patent No.: US 12,746,817 B2
(45) Date of Patent: Sep. 29, 2026

(54) VEHICLE BEHAVIOR CONTROL DEVICE

(71) Applicants: SUBARU CORPORATION, Tokyo (JP); TOYOTA JIDOSHA KABUSHIKI KAISHA, Aichi-ken (JP)

(72) Inventor: Takeru Shinohara, Tokyo (JP)

(73) Assignees: SUBARU CORPORATION, Tokyo (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 520 days.

(21) Appl. No.: 18/340,352

(22) Filed: Jun. 23, 2023

(65) Prior Publication Data

US 2024/0017609 A1 Jan. 18, 2024

(30) Foreign Application Priority Data

Jul. 13, 2022 (JP) ................................ 2022-112404

(51) Int. Cl.
*B60K 23/08* (2006.01)
*B60W 10/14* (2012.01)

(52) U.S. Cl.
CPC .. *B60K 23/0808* (2013.01); *B60K 2023/0816* (2013.01); *B60W 10/14* (2013.01);
(Continued)

(58) Field of Classification Search
CPC ....... B60K 23/0808; B60K 2023/0816; B60W 10/14; B60W 2530/00; B60W 2710/12;
(Continued)

(56) References Cited

U.S. PATENT DOCUMENTS 10,160,316 B2 * 12/2018 Burt ...................... B60W 10/18
2001/0027144 A1 10/2001 Murakami et al.
(Continued)

FOREIGN PATENT DOCUMENTS

JP 62-144730 A 6/1987
JP S62-14473 U 9/1987
(Continued)

OTHER PUBLICATIONS

Notice of Reasons for Refusal received in corresponding Japanese Patent Application No. 2022-112404, dated Aug. 4, 2026.

*Primary Examiner* — Valentin Neacsu
*Assistant Examiner* — Marlon A Arce
(74) *Attorney, Agent, or Firm* — RIMON P.C.

(57) ABSTRACT

A vehicle behavior control device is provided in a vehicle that includes a suspension device supporting a wheel so as to allow a stroke with respect to a vehicle body, and having a geometry in which a center of the wheel is displaced in a direction in which a wheelbase stretches and contracts due to the stroke, and a front and rear wheel differential rotation constraining member that constrain differential rotation between a front wheel driving force transmission mechanism that transmit a driving force to front wheels and a rear wheel driving force transmission mechanism that transmit a driving force to rear wheels. The vehicle behavior control device includes a front and rear wheel differential rotation constraining control unit that increase a constraining force of the front and rear wheel differential rotation constraining member in response to occurrence of a pitching behavior of the vehicle body.

5 Claims, 8 Drawing Sheets

(52) U.S. Cl.
CPC ..... *B60W 2530/00* (2013.01); *B60W 2710/12* (2013.01); *B60Y 2300/80* (2013.01); *B60Y 2400/80* (2013.01)

(58) Field of Classification Search
CPC .. B60W 30/045; B60W 10/04; B60W 10/119; B60W 10/18; B60W 10/22; B60W 30/025; B60Y 2300/80; B60Y 2400/80
See application file for complete search history.

(56) References Cited

U.S. PATENT DOCUMENTS

| | | | | |
|---|---|---|---|---|
| 2002/0007239 | A1 * | 1/2002 | Matsumoto | B60W 30/02 701/41 |
| 2014/0088833 | A1 * | 3/2014 | Matsuno | B60W 30/045 701/41 |
| 2021/0139016 | A1 * | 5/2021 | Horiguchi | B60W 50/0097 |
| 2022/0024445 | A1 * | 1/2022 | Anker | B60W 30/02 |
| 2023/0001943 | A1 * | 1/2023 | Shinohara | B60W 40/114 |
| 2023/0356724 | A1 * | 11/2023 | Weston | B60W 40/10 |

FOREIGN PATENT DOCUMENTS

| | | | |
|---|---|---|---|
| JP | H02-038106 | A | 2/1990 |
| JP | H02-241838 | A | 9/1990 |
| JP | H07-035654 | A | 2/1995 |
| JP | 2001-277896 | A | 10/2001 |
| JP | 2007-015553 | A | 1/2007 |
| JP | 2009-184522 | A | 8/2009 |
| JP | 4781695 | B2 | 9/2011 |

* cited by examiner

WHEN PITCHING TO REARWARD TILTING DIRECTION

WHEN PITCHING TO FORWARD TILTING DIRECTION

VEHICLE BEHAVIOR CONTROL DEVICE

CROSS-REFERENCE TO RELATED APPLICATIONS

The present application claims priority from Japanese Patent Application No. 2022-112404 filed on Jul. 13, 2022, the entire contents of which are hereby incorporated by reference.

BACKGROUND

Technical Field

The present disclosure relates to a vehicle behavior control device that controls a pitching behavior of a vehicle body of a vehicle.

Background Art

As a technique related to control of a limited slip differential mechanism provided in a vehicle, for example, Japanese Patent No. 4781695 describes a control device of a four-wheel drive vehicle in which in order to reliably prevent tight-corner braking phenomenon and to sufficiently and stably exert a function of a limited slip differential mechanism, an actual limited slip differential torque of a limited slip differential portion that distributes a driving force of an engine to a front shaft and a rear shaft is calculated based on axial torques of front wheels or rear wheels, and when an oscillation state is detected in which the actual limited slip differential torque oscillates against the indicated value of the limited slip differential torque, the indicated value of the limited slip differential torque is decreased and corrected. Japanese Unexamined Patent Application Publication (JP-A) No. 2001-277896 describes an inter-axle differential apparatus of a vehicle, including: an inter-axle differential that distributes a torque to front wheels and rear wheels at a predetermined ratio; an inter-axle differential lock that locks the inter-axle differential; and a control device that controls the inter-axle differential lock, in which rotational frequencies of a transmission output shaft, and a front output shaft and a rear output shaft of the inter-axle differential are detected, a sign of slipping of a drive wheel is detected based on the rotational frequencies, and a differential lock signal is output to the inter-axle differential lock when the sign of slipping is found. Japanese Unexamined Utility Model (Registration) Application Publication (JP-UM-A) No. S62-144730 describes a walking-type powered agricultural machine including a differential device that allows differential rotation between left and right wheels and has a differential lock mechanism, and a rotary tillage device, in which the differential device is operated when a machine body inclines forward and downward over a predetermined angle.

SUMMARY

An aspect of the present disclosure provides a vehicle behavior control device provided in a vehicle. The vehicle includes a suspension device supporting a wheel so as to allow a stroke in a bound direction and a rebound direction with respect to a vehicle body, and having a geometry in which a center of the wheel is displaced in a direction in which a wheelbase stretches and contracts due to the stroke, and a front and rear wheel differential rotation constraining member configured to constrain differential rotation between a front wheel driving force transmission mechanism configured to transmit a driving force to front wheels and a rear wheel driving force transmission mechanism configured to transmit a driving force to rear wheels. The vehicle behavior control device includes a front and rear wheel differential rotation constraining control unit configured to increase a constraining force of the front and rear wheel differential rotation constraining member in response to occurrence of a pitching behavior of the vehicle body.

An aspect of the present disclosure provides a vehicle behavior control device provided in a vehicle. The vehicle includes a suspension device supporting a wheel so as to allow a stroke in a bound direction and a rebound direction with respect to a vehicle body, and having a geometry in which a center of the wheel is displaced in a direction in which a wheelbase stretches and contracts depending on the stroke, and a front and rear wheel differential rotation constraining member configured to constrain differential rotation between a front wheel driving force transmission mechanism configured to transmit a driving force to front wheels and a rear wheel driving force transmission mechanism configured to transmit a driving force to rear wheels. The vehicle behavior control device includes a braking and driving force difference output member configured to output a braking and driving force difference between the front wheels and the rear wheels depending on a pitching behavior of the vehicle body, and a front and rear wheel differential rotation constraining control unit configured to increase a constraining force of the front and rear wheel differential rotation constraining member in accordance with an increase in the braking and driving force difference.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

For example, when a vehicle travels on a wavy uneven road surface, a pitching behavior may occur in which a vehicle body periodically swings in a nose-up direction and a nose-dive direction, and if such a behavior becomes excessive, this behavior may lead to discomfort and anxiety of an occupant. In addition, the pitching behavior may change depending on a loading condition of cargo, and a pitch angle tends to become excessively large. In this regard, as a method to control a sprung behavior of the vehicle, it is considered to perform braking and driving force control on each wheel by controlling a brake or engine torque (motor torque), or to add an actuator to a suspension device to control as an active suspension. However, when such braking and driving force control and active suspension control are performed, there is a problem that a configuration of a device and a content of control become complicated. Furthermore, the braking and driving force control may cause unnecessary acceleration and deceleration for controlling the pitching behavior, which may make a driver and other occupants feel uncomfortable and unpleasant. It is desirable to provide a vehicle behavior control device that suppresses a pitching behavior of a vehicle body with a simple configuration.

Hereinafter, embodiments will be described with reference to the drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
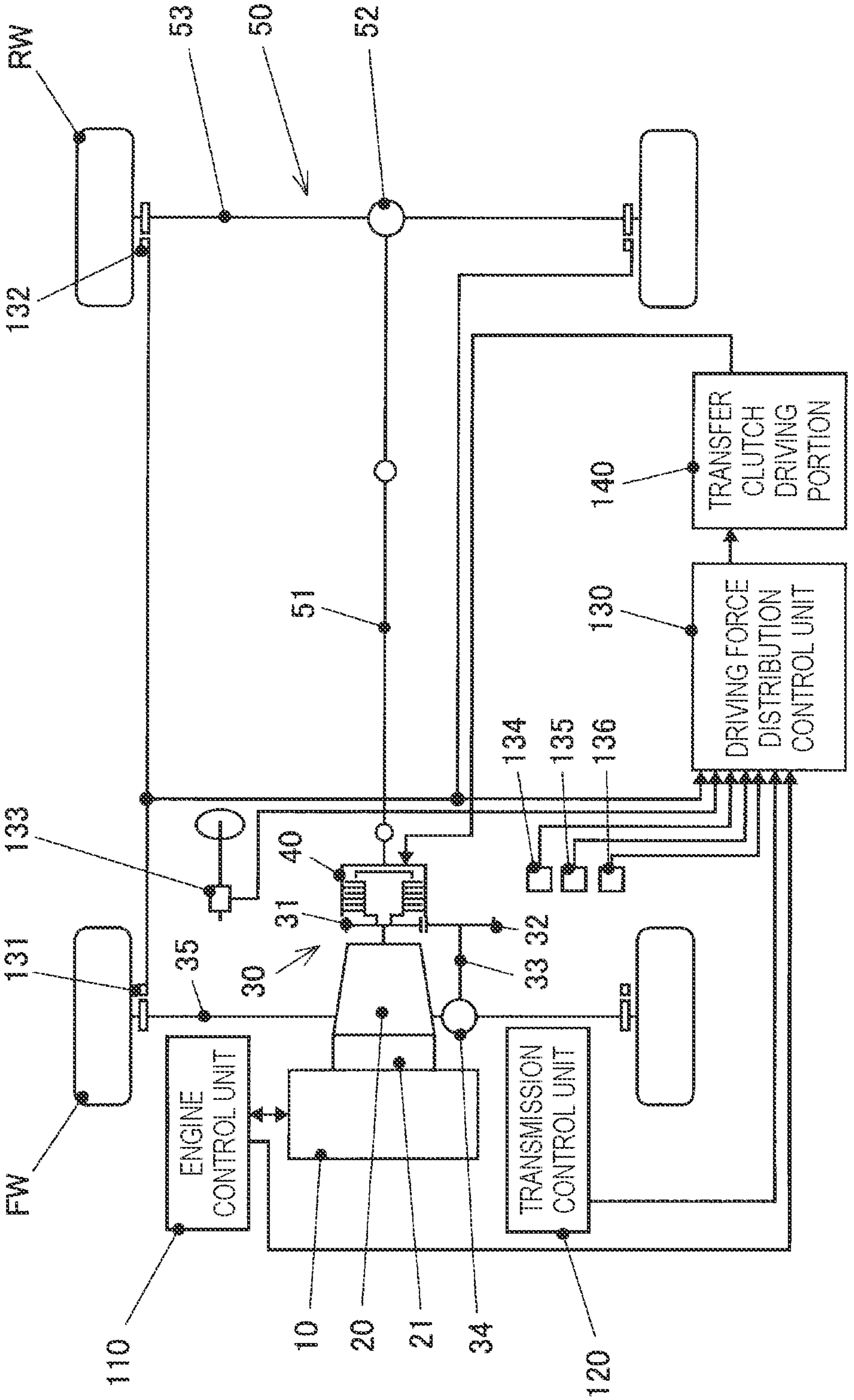
FIG. 1 is a diagram schematically illustrating a configuration of a drive system of a vehicle having a first embodiment of a vehicle behavior control device to which the present disclosure is applied.

A first embodiment of a vehicle behavior control device to which the present disclosure is applied will be described below. The vehicle behavior control device according to the first embodiment is, for example, provided in a vehicle such as a four-wheel drive (AWD) passenger car, and controls a pitching behavior of a vehicle body. FIG. 1 is a diagram schematically illustrating a configuration of a drive system of a vehicle having the vehicle behavior control device according to the first embodiment.

A vehicle 1 includes a pair of left and right front wheels FW and left and right rear wheels RW, an engine 10, a transmission 20, a front wheel driving force transmission mechanism 30, a transfer clutch 40, a rear wheel driving force transmission mechanism 50, an engine control unit 110, a transmission control unit 120, a driving force distribution control unit 130, a transfer clutch driving portion 140, and the like.

The engine 10 is a traveling power source for a vehicle. As the engine 10, for example, a 4-stroke gasoline engine can be used. The traveling power source for the vehicle 1 is not limited to the engine 10, and may be an engine-electric hybrid system having the engine 10 and a motor generator, or a configuration having only a motor generator.

The transmission 20 includes a transmission mechanism unit that reduces or increases a rotation speed of an output shaft of the engine 10 at a predetermined transmission gear ratio. As the transmission mechanism unit, for example, a configuration having a chain type or belt type CVT variator, planetary gear sets, or the like can be used.

A torque converter 21 is provided between the engine 10 and the transmission 20. The torque converter 21 is a fluid coupling serving as a starting device which enables starting from a vehicle speed of zero. The torque converter 21 is provided with a lock-up clutch that constrains a relative rotation between an input portion (impeller) and an output portion (turbine) under predetermined conditions.

The front wheel driving force transmission mechanism 30 is a power transmission mechanism that transmits rotation of an output shaft of the transmission 20 to the left and right front wheels FW. The front wheel driving force transmission mechanism 30 includes a drive gear 31, a driven gear 32, a pinion shaft 33, a front differential 34, a front drive shaft 35, and the like.

The drive gear 31 and the driven gear 32 are a pair of helical gears provided on a parallel shaft. The drive gear 31 is directly coupled to the output shaft of the transmission 20. The driven gear 32 is provided on the pinion shaft 33. The pinion shaft 33 is a rotation shaft that transmits to the front differential 34 a torque transmitted from the transmission 20 via the drive gear 31 and the driven gear 32. The pinion shaft 33 is provided with a pinion gear that transmits a driving force to a ring gear (not shown) provided on an outer peripheral portion of the front differential 34. The pinion gear of the pinion shaft 33 and the ring gear of the front differential 34 serve as a final speed reducer.

The front differential 34 is a differential mechanism that transmits the driving force transmitted from the pinion shaft 33 to the left-right front drive shaft 35 and absorbs a rotation speed difference between the left and right front wheels FW. The front drive shaft 35 is a rotation shaft that transmits the driving force from the front differential 34 to the left and right front wheels FW. The front drive shaft 35 is provided with a universal joint or the like for changing a rotation direction in order to follow the stroke of the suspension and steering of the front wheels FW.

The transfer clutch 40 is an engagement element provided between the output shaft of the transmission 20 and a front end portion of a propeller shaft 51 of the rear wheel driving force transmission mechanism 50. The transfer clutch 40 includes a hydraulic or electromagnetic wet multi-plate clutch that can change a torque transmitted from the output shaft of the transmission 20 to the propeller shaft 51 by adjusting the constraining force. The transfer clutch 40 can continuously change the constraining force between a front shaft coupled to the output shaft of the transmission 20 and a rear shaft coupled to the front end portion of the propeller shaft 51 from a locked state (direct connection state) to a free state (released state) where torque transmission is not performed except for friction that occurs unavoidably. The transfer clutch 40 is a front and rear wheel differential rotation constraining member that constrains differential rotation between the front wheel driving force transmission mechanism 30 and the rear wheel driving force transmission mechanism 50 that transmits the driving force to the rear wheels.

The drive gear 31, the driven gear, the pinion shaft 33, the front differential 34, and the transfer clutch 40 of the front wheel driving force transmission mechanism 30 are housed inside a transmission case (not shown) that is a common housing with the transmission 20.

The rear wheel driving force transmission mechanism 50 is a power transmission mechanism that transmits the rotation of the output shaft of the transmission 20 transmitted via the transfer clutch 40 to the left and right rear wheels RW. The rear wheel driving force transmission mechanism 50 includes the propeller shaft 51, a rear differential 52, a rear drive shaft 53, and the like.

The propeller shaft 51 is a rotation shaft that transmits a driving force from the rear shaft of the transfer clutch 40 to the rear differential 52. The rear differential 52 is a differential mechanism that transmits a driving force transmitted from the propeller shaft 51 to the left-right rear drive shaft 53 and absorbs a rotation speed difference between the left and right rear wheels RW. The rear differential 52 is provided with a final speed reducer that reduces a rotation speed of the propeller shaft 51 at a predetermined final reduction ratio and transmits the reduced speed to the rear drive shaft 53. The rear drive shaft 53 is a rotation shaft that transmits a driving force from the rear differential 52 to the left and right rear wheels RW. The rear drive shaft 53 is provided with a universal joint or the like for changing a rotation direction in order to follow the stroke of the suspension.

The engine control unit 110 is a device that comprehensively controls the engine and accessories thereof. The engine control unit 110 sets a required torque according to, for example, an accelerator operation amount of a driver, and controls an output of the engine 10 such that a torque actually generated by the engine 10 (actual torque) matches the required torque. The engine control unit 110 transmits an estimated value of the actual torque of the engine 10 (which normally matches the required torque) to the driving force distribution control unit 130.

The transmission control unit 120 is a device that comprehensively controls the transmission 20 and accessories thereof. The transmission control unit 120 has a function of controlling the transmission gear ratio in the transmission 20 and an engagement force of the lock-up clutch in the torque converter 21. The transmission control unit 120 transmits, to the driving force distribution control unit 130, information related to the transmission gear ratio of the transmission 20 and a torque ratio when the torque converter 21 is generating a torque amplification effect.

The driving force distribution control unit 130 is a device that controls a driving force distribution of the front and rear shafts by controlling the engagement force of the transfer clutch 40 via the transfer clutch driving portion 140. During normal traveling of the vehicle 1 (except when a pitching behavior, which will be described later) occurs, the driving force distribution control unit 130 sets a target value for a front and rear driving force distribution according to a current traveling state (for example, acceleration and deceleration state and turning state) of the vehicle 1, and controls the engagement force of the transfer clutch 40 according to this target value. The driving force distribution control unit 130 can maintain such a target value of the front and rear driving force distribution during the normal traveling as a map value read based on the traveling state of the vehicle 1. In addition, the driving force distribution control unit 130 serves as a front and rear wheel differential rotation constraining control unit that increases the constraining force of the transfer clutch 40 in accordance with an increase in a magnitude of the pitching behavior with respect to a predetermined input (acceleration and the like) to a vehicle body B.

Vehicle speed sensors 131 and 132, a steering angle sensor 133, an acceleration sensor 134, a yaw rate sensor 135, a suspension stroke sensor 136, and the like are coupled to the driving force distribution control unit 130. The vehicle speed sensors 131 and 132 are sensors that output vehicle speed signals corresponding to the rotation speeds (angular velocities) of the front wheels FW and the rear wheels RW, respectively. The vehicle speed sensors 131 and 132 are provided in hub portions that rotatably support the front wheels FW and the rear wheels RW. The vehicle speed sensors 131 and 132 are provided on the left and right front wheels FW and rear wheels RW, respectively.

The steering angle sensor 133 is a sensor that detects an angular position (steering wheel angle) of a steering wheel that is steered by an occupant (driver). The driving force distribution control unit 130 can calculate a steering angle of the front wheels FW based on the steering wheel angle detected by the steering angle sensor 133 and a gear ratio (constant) of a steering gear box (not shown). The steering angle sensor 133 serves as a straight traveling state determination unit of the present disclosure. The acceleration sensor 134 is a sensor that detects acceleration acting on the vehicle body in a front-rear direction and in a left-right direction (vehicle width direction). The yaw rate sensor 135 is a sensor that detects a yaw rate, which is a rotation speed of the vehicle body about a vertical axis.

The suspension stroke sensor 136 is a sensor that is provided in a front-rear suspension device which supports the front wheels FW and the rear wheels RW so as to be able to vertically stroke with respect to the vehicle body, and that detects displacement in a stroke direction. The driving force distribution control unit 130 calculates a pitch angle of the vehicle body B based on an output of the suspension stroke sensor 136.

The engine control unit 110, the transmission control unit 120, and the driving force distribution control unit 130 can be configured as a microcomputer, for example, including an information processing unit such as a CPU, a storage unit such as a RAM and a ROM, an input and output interface, and a bus coupling these. The engine control unit 110, the transmission control unit 120, and the driving force distribution control unit 130 are communicably coupled via an in-vehicle LAN such as a CAN communication system or coupled directly.

The transfer clutch driving portion 140 is a device that controls the engagement force of the transfer clutch 40. The transfer clutch driving portion 140 has a function of adjusting a hydraulic pressure that is a source of the engagement force in the transfer clutch 40 when the transfer clutch 40 is of a hydraulic type, for example. The transfer clutch driving portion 140 includes a pressure regulating valve that regulates a hydraulic pressure supplied from an oil pump (not shown) provided in the transmission 20 and supplies the hydraulic pressure to the transfer clutch 40. The transfer clutch driving portion 140 adjusts the constraining force by controlling the hydraulic pressure of transfer clutch 40 according to an indicated value from the driving force distribution control unit 130.

Figure 2:
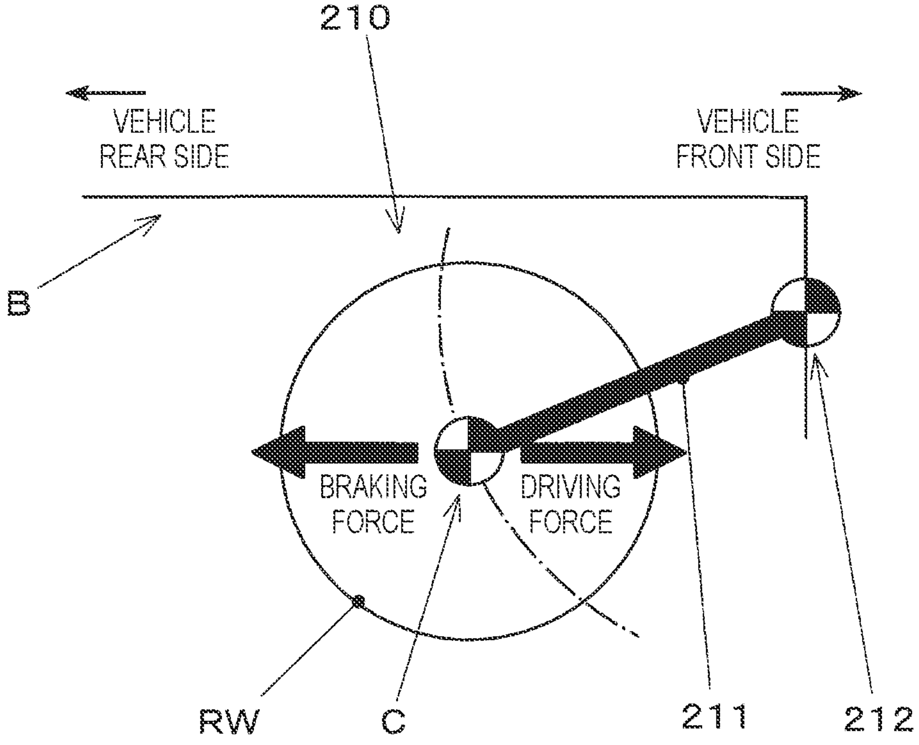
FIG. 2 is a diagram schematically illustrating a configuration of a rear suspension device for the vehicle having the vehicle behavior control device according to the first embodiment.

The vehicle 1 includes a rear suspension device which will be described below. FIG. 2 is a diagram schematically illustrating a configuration of the rear suspension device for the vehicle having the vehicle behavior control device according to the first embodiment. FIG. 2 illustrates the rear suspension device that supports the right rear wheel RW as viewed from the outside in the vehicle width direction. In order to facilitate understanding, FIG. 2 illustrates, in the configuration of the rear suspension device, only elements that dominate a behavior of a wheel center C during the stroke when viewed in the vehicle width direction. (The same applies to FIGS. 7 to 9 to be described later)

In the first embodiment, a rear suspension device 210 is of a trailing link arm type, for example. A hub bearing housing (not shown) to which the rear wheel RW is attached is attached to the vehicle body B via a trailing arm 211. The trailing arm 211 protrudes forward and obliquely upward from the wheel center C of the rear wheel RW. A front end portion 212 of the trailing arm 211 is coupled to the vehicle body B on a front side and an upper side with respect to the wheel center C so as to be capable of swinging about a central axis along the vehicle width direction.

In such a trailing arm type rear suspension device 210, a trajectory of the wheel center C during the stroke is an arc centered on the front end portion 212 of the trailing arm 211, as indicated by a dashed line in FIG. 2. In this case, when the rear suspension device 210 strokes in a bound direction (contraction direction), the wheel center C moves backward while rising relative to the vehicle body B. In addition, when the rear suspension device 210 strokes in a rebound direction (stretching direction), the wheel center C moves forward while descending relative to the vehicle body B.

Figure 3:
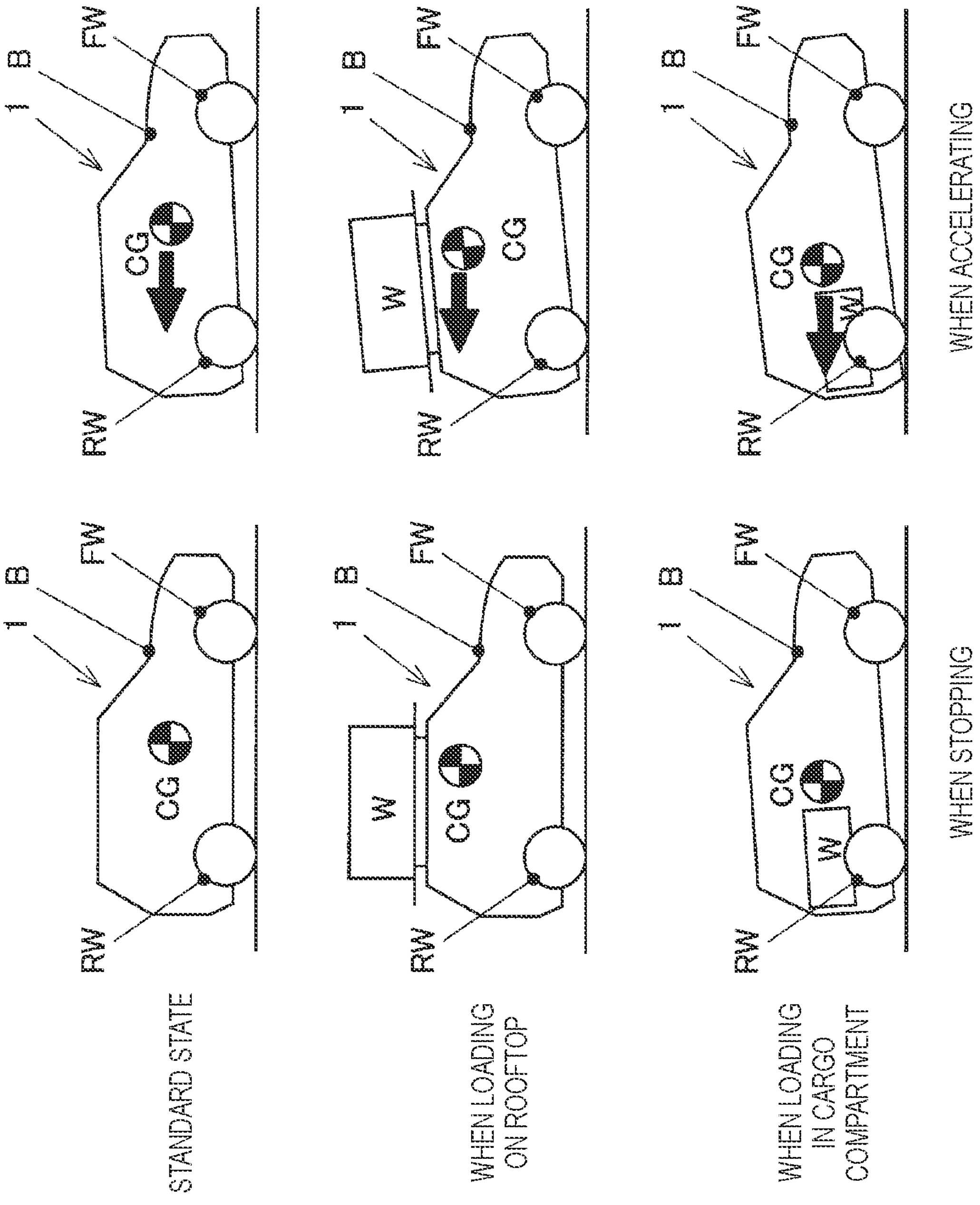
FIG. 3 is a diagram schematically illustrating a relationship between a loading state and a pitching behavior of the vehicle.

The pitching behavior when there is an input (front-rear acceleration and the like) to the vehicle 1 is affected by changes in a position of the center of gravity and the like due to the loading state, and the like. FIG. 3 is a diagram schematically illustrating a relationship between the loading state and the pitching behavior of the vehicle. FIG. 3 illustrates, in order from the top, a normal state, a rooftop loading state, and a cargo compartment loading state, and a left side of each part illustrates a stop state (when the front-rear acceleration does not act), and a right side thereof illustrates a state during acceleration. When the vehicle is accelerated, a center of gravity CG is subjected to the acceleration toward a rear side of the vehicle body, causing the pitching behavior in a direction in which a front portion of the vehicle body rises and a rear portion of the vehicle body descends.

The rooftop loading state illustrated in a middle part of FIG. 3 is a state in which a heavy object W is placed on an upper side of a roof using a carrier or the like. In this case, a height of the center of gravity is higher than that in the normal state shown in the upper part, and a moment causing the pitching behavior of the vehicle body B is increased when the acceleration acts on the center of gravity CG. Accordingly, for example, amplitude of the pitching behavior in a case where the same acceleration as in the normal state acts on the center of gravity CG is greater in the rooftop loading state. (The drag force against the pitching behavior is reduced.)

The cargo compartment loading state illustrated in a lower part of FIG. 3 is a state in which the heavy object W is loaded in a cargo compartment (luggage room) provided in the rear portion of the vehicle. In this case, the position of the center of gravity moves backward with respect to the normal state illustrated in the upper part, and in this case as well, when the acceleration acts on the center of gravity CG, the moment causing the pitching behavior of the vehicle body is increased. Accordingly, for example, when the same acceleration as in the normal state acts on the center of gravity CG, amplitude of the pitching behavior is greater in the cargo compartment loading state. (The drag force against the pitching behavior is reduced.) Furthermore, in the cargo compartment loading state, the rear portion of the vehicle body has already been tilted in a downward direction with respect to the normal state when the vehicle is stopped, and if the vehicle is accelerated from this state, the occupant will have an impression that the pitching behavior is larger than the actual pitching behavior.

Figure 4:
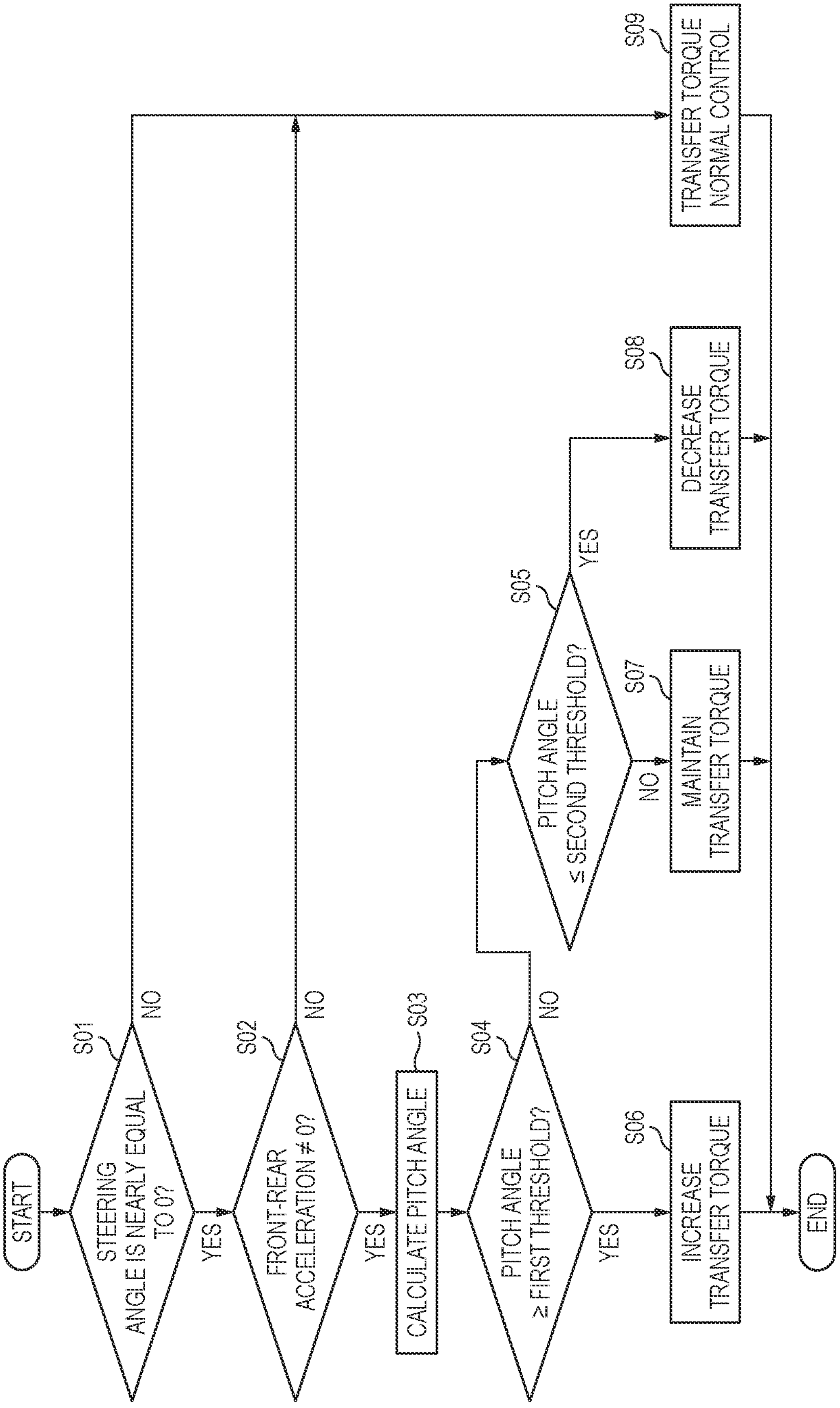
FIG. 4 is a flowchart illustrating pitching behavior suppression control in the vehicle behavior control device according to the first embodiment.

In the first embodiment, even when the amplitude of the pitching behavior of the vehicle body increases with respect to the normal state, the pitching behavior is brought closer to the normal state by the control described below. FIG. 4 is a flowchart illustrating pitching behavior suppression control in the vehicle behavior control device according to the first embodiment. Steps will be described in order below.

<Step S01: Straight Traveling Determination>

The driving force distribution control unit 130 calculates the steering angle of the front wheels FW based on the output of the steering angle sensor 133. If the steering angle is zero or a predetermined minute value, the vehicle 1 is assumed to be in a straight traveling state, and the process proceeds to step S02, and otherwise, the vehicle 1 is in the turning state, and the process proceeds to step S09.

<Step S02: Front-Rear Acceleration Determination>

The driving force distribution control unit 130 calculates the acceleration acting on the vehicle body in the front-rear direction based on the output of the acceleration sensor 134. If the acceleration in the front-rear direction is occurring in the vehicle body (for example, if the acceleration whose absolute value is equal to or greater than a predetermined value is detected), there is a high possibility that the pitching behavior of the vehicle body B occurs, and the process proceeds to step S03, and otherwise, the process proceeds to step S09.

<Step S03: Pitch Angle Calculation>

The driving force distribution control unit 130 calculates the pitch angle at a maximum amplitude of pitching vibration of the vehicle body based on the output of the suspension stroke sensor 136. Then, the process proceeds to step S04.

<Step S04: Comparison Between Pitch Angle and First Threshold>

The driving force distribution control unit 130 compares the pitch angle calculated in step S03 with a preset first threshold. The first threshold can be, for example, the pitch angle (pitch stiffness) with respect to the front-rear acceleration when the loading state of the vehicle 1 is a standard state. In this case, the first threshold can be calculated by a first-order approximation formula set based on data acquired by a preliminary test or simulation. If the pitch angle is equal to or greater than the first threshold, the process proceeds to step S06 assuming that the amplitude of the pitching behavior of the vehicle body B is likely to increase with respect to the normal state (the drag force to the pitching behavior is low), and otherwise proceeds to step S05.

<Step S05: Comparison Between Pitch Angle and Second Threshold>

The driving force distribution control unit 130 compares the pitch angle calculated in step S03 with a second threshold that is preset and smaller than the first threshold. The second threshold can also be calculated by the first-order approximation formula, similar to the first threshold. If the pitch angle is equal to or smaller than the second threshold, the process proceeds to step S08 assuming that the amplitude of the pitching behavior of the vehicle body B is difficult to increase with respect to the normal state (the drag force to the pitching behavior is high), and otherwise proceeds to step S07.

<Step S06: Increase in Transfer Torque>

The driving force distribution control unit 130 increases the constraining force (engagement force) of the transfer clutch 40 from a previous value, and increases a transmission torque (transfer torque) of the transfer clutch 40. After that, a series of processes ends.

<Step S07: Transfer Torque Maintenance>

The driving force distribution control unit 130 maintains the constraining force (engagement force) of the transfer clutch 40 at the previous value to maintain the transfer torque. After that, a series of processes ends.

<Step S08: Decrease in Transfer Torque>

The driving force distribution control unit 130 decreases the constraining force (engagement force) of the transfer clutch 40 from the previous value to decrease the transfer torque. After that, a series of processes ends.

<Step S09: Transfer Torque Normal Control>

The driving force distribution control unit 130 performs constraining force (engagement force) control of the transfer clutch 40 at normal based on a previously prepared map value of the front and rear driving force distribution. When the vehicle 1 is in the turning state, the constraining force of the transfer clutch 40 in this case becomes, for example, a turning constraining force optimized for turning performance of the vehicle. After that, a series of processes ends. The series of processes described above can be sequentially restarted after the constraining force control of the transfer clutch 40, and feedback control can be performed. Accordingly, characteristics of the pitching behavior of the vehicle 1 can always be brought closer to the normal state.

Figure 5A:
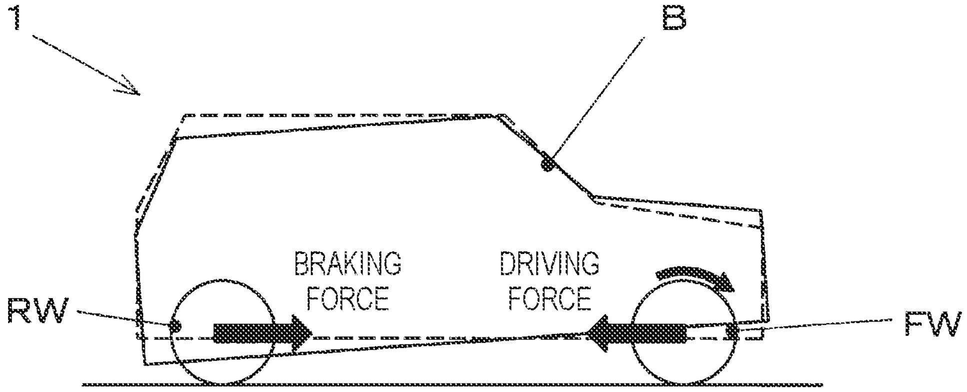
FIG. 5A and FIG. 5B are diagrams each schematically illustrating a relationship between the pitching behavior and an internal circulation torque of the vehicle.
Figure 5B:
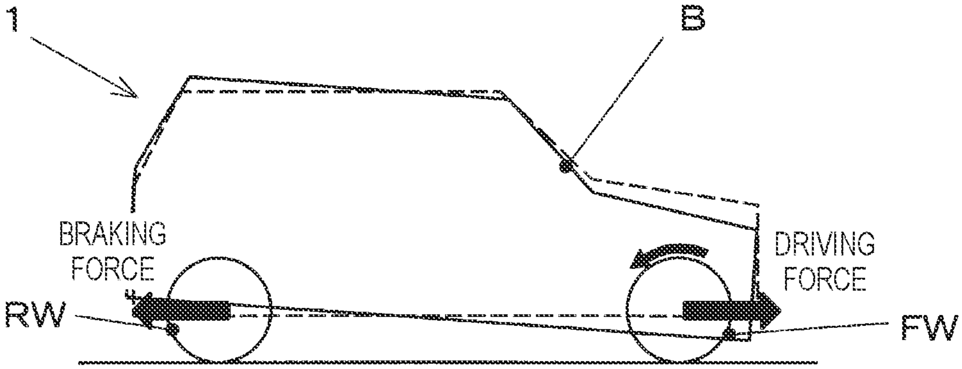

A principle by which the pitching behavior of the vehicle body can be suppressed by increasing the constraining force of the transfer clutch 40 will be described below. FIG. 5A and FIG. 5B are diagrams each schematically illustrating a relationship between the pitching behavior and an internal circulation torque of the vehicle. FIG. 5A illustrates a change from forward tilting (nose dive) to rearward tilting (nose up), and FIG. 5B illustrates a change from the rearward tilting to the forward tilting.

In an AWD vehicle such as the vehicle 1, if the pitching behavior occurs and opposite phase strokes occur in a front suspension and a rear suspension, as illustrated in FIGS. 5A and 5B, since the front wheels FW rotate with respect to the vehicle body, slipping occurs in the front wheels FW and the rear wheels RW, and an internal circulation torque exchanged between the front wheel driving force transmission mechanism 30 and the rear wheel driving force transmission mechanism 50 via the transfer clutch 40 is generated.

As illustrated in FIG. 5A, when a posture changes from the forward tilting to the rearward tilting, the rear suspension changes from a rebound state to a bound state. In this case, when the wheel center C of the rear wheel RW retreats with respect to the vehicle body B, the wheelbase changes in the stretching direction. In this case, the driving force is applied to the rear wheels RW by the internal circulation torque. Therefore, the wheel center C of the rear wheel RW moves from the rebound direction to the bound direction (from bottom to top) along the trajectory illustrated in FIG. 2. In this case, since a tangential force of the trajectory of the wheel center C of the driving force is applied downward, the movement of the wheel center C is hindered. Accordingly, the stroke of the rear suspension is reduced, and as a result, a stroke amount when the vehicle body B shifts from the forward tilting to the rearward tilting is reduced.

As illustrated in FIG. 5B, when a posture changes from the rearward tilting to the forward tilting, the rear suspension changes from the bound state to the rebound state. In this case, when the wheel center C of the rear wheel RW advances with respect to the vehicle body B, the wheelbase changes in a contraction direction. In this case, a braking force is applied to the rear wheels RW by the internal circulation torque. Therefore, the wheel center C of the rear wheel RW moves from the bound direction to the rebound direction (from top to bottom) along the trajectory illustrated in FIG. 2. In this case, since the tangential force of the trajectory of the wheel center C of the driving force is applied upward, the movement of the wheel center C is hindered. Accordingly, the stroke of the rear suspension is reduced, and as a result, a stroke amount when the vehicle body B shifts from the rearward tilting to the forward tilting is reduced.

As described above, a change amount (amplitude) of the pitching behavior of the vehicle body (sprung portion) is reduced by reducing the stroke of the rear suspension. Here, the internal circulation torque can be adjusted by an engagement torque of the transfer clutch 40, which is a limited slip differential mechanism (LSD), and the internal circulation torque is maximized when the transfer clutch 40 is locked. Since the braking and driving force described above increases as the internal circulation torque increases, the pitching behavior can be controlled by controlling the constraining force (transfer torque) of the transfer clutch 40.

According to the first embodiment described above, the following effects can be obtained.

(1) According to the first embodiment, by increasing the constraining force of the transfer clutch 40 according to the occurrence of the pitching behavior of the vehicle body B, the transfer torque (internal circulation torque) exchanged between the front wheel driving force transmission mechanism 30 and the rear wheel driving force transmission mechanism 50 can be increased. Such an internal circulation torque constrains the differential rotation of the front wheels FW and the rear wheels RW, and acts as a drag force when the wheelbase fluctuates according to the stroke of the suspension device, and thus, the internal circulation torque has an effect of suppressing the suspension stroke and can suppress the pitching behavior of the vehicle body B. Such a transfer clutch 40 is generally provided in a four-wheel drive (AWD) vehicle that drives the front and rear wheels, and it is unnecessary to provide new and dedicated hardware in order to suppress the pitching behavior in the vehicle 1, and it is possible to suppress the pitching behavior with a simple configuration.

(2) When a magnitude of the pitch angle with respect to a predetermined front-rear acceleration of the vehicle body B is larger than a predetermined threshold, by increasing the constraining force of the transfer clutch 40 compared to the normal state, when the pitching behavior of the vehicle body B is likely to increase due to, for example, a loading state, the pitching behavior can be suppressed so as to be brought closer to a normal state.

(3) The pitching behavior is suppressed by increasing the constraining force of the transfer clutch 40 only when traveling straight ahead, so that it is possible to optimize the constraining force of the transfer clutch 40 during the turning so as to improve the turning performance, and to suppress an influence on the turning performance due to the application of the present disclosure.

Second Embodiment

Figure 6:
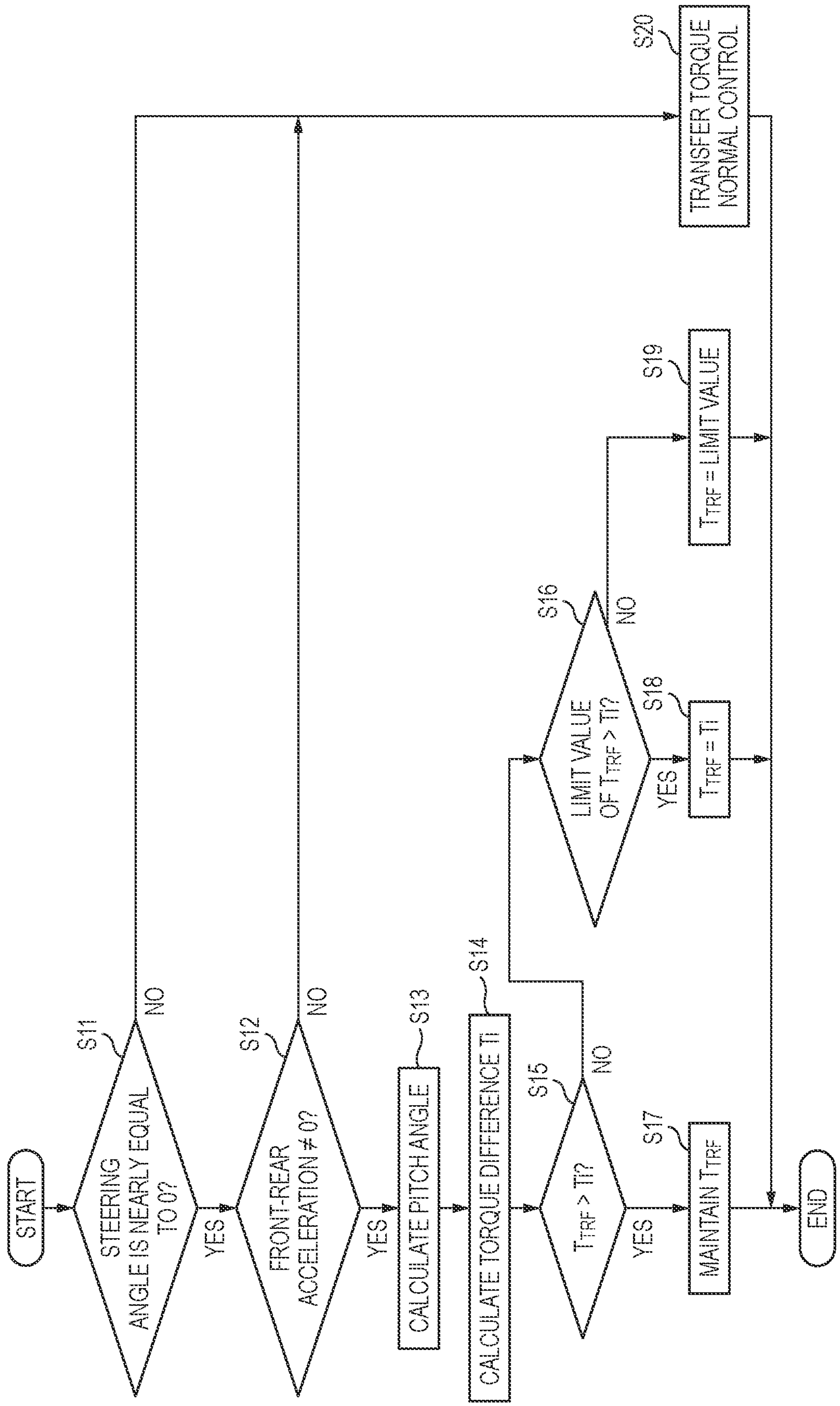
FIG. 6 is a flowchart illustrating pitching behavior suppression control in a second embodiment of a vehicle behavior control device to which the present disclosure is applied.

A second embodiment of a vehicle behavior control device to which the present disclosure is applied will be described below. In each of the embodiments described below, the description of the parts common to the previous embodiment will be omitted, and mainly differences will be described. In the vehicle behavior control device according to the second embodiment, the constraining force of the transfer clutch 40 is increased in accordance with an increase in the braking and driving force difference between the front wheels FW and the rear wheels RW caused by the pitching behavior of the vehicle 1. FIG. 6 is a flowchart illustrating pitching behavior suppression control in the vehicle behavior control device according to the second embodiment. Steps will be described in order below.

<Step S11: Straight Traveling Determination>

The driving force distribution control unit 130 calculates the steering angle of the front wheels FW based on the output of the steering angle sensor 133. If the steering angle is zero or a predetermined minute value, the vehicle 1 is assumed to be in the straight traveling state, and the process proceeds to step S12, and otherwise, the vehicle 1 is in the turning state, and the process proceeds to step S20.

<Step S12: Front-Rear Acceleration Determination>

The driving force distribution control unit 130 calculates the acceleration acting on the vehicle body in the front-rear direction based on the output of the acceleration sensor 134. If the acceleration in the front-rear direction is occurring in the vehicle body (for example, if the acceleration whose absolute value is equal to or greater than a predetermined value is detected), there is a high possibility that the pitching behavior of the vehicle body B occurs, and the process proceeds to step S13, and otherwise, the process proceeds to step S20.

<Step S13: Pitch Angle Calculation>

The driving force distribution control unit 130 calculates the pitch angle at a maximum amplitude of pitching vibration of the vehicle body based on the output of the suspension stroke sensor 136. Then, the process proceeds to step S14.

<Step S14: Torque Ti Calculation Based on Front-Rear Driving Force Difference>

The driving force distribution control unit 130 calculates a torque Ti input to the transfer clutch 40 based on the driving force difference between the front wheels FW and the rear wheels RW according to the pitching behavior. The driving force distribution control unit 130 serves as a braking and driving force difference output member. The torque Ti is calculated by the following formula:

$$Ti = K(\mu)\left\{\frac{V_f - V}{V}R_f - \frac{V_r - V}{V}R_r\right\}$$

where Ti indicates torque resulting from braking and driving force difference between front and rear wheels; K(μ) indicates driving stiffness; $V_f$ indicates wheel speed of front wheel FW; $V_r$ indicates wheel speed of rear wheel RW; V indicates vehicle speed; $R_f$ indicates tire dynamic load radius of front wheel FW; and $R_r$ indicates tire dynamic load radius of rear wheel RW. Then, the process proceeds to step S15.

<Step S15: Comparison Between Transfer Torque $T_{TRF}$ and Torque Ti>

The driving force distribution control unit 130 compares a transfer torque $T_{TRF}$, which is a current transmission torque of the transfer clutch 40, with the torque Ti resulting from the braking and driving force difference obtained in step S14. If $T_{TRF}$>Ti, the process proceeds to step S17, and otherwise, the process proceeds to step S16.

<Step S16: Comparison Between Limit Value of Transfer Torque $T_{TRF}$ and Torque Ti>

The driving force distribution control unit 130 compares a limit value (maximum value) of the transfer torque $T_{TRF}$ that can be generated by the transfer clutch 40 with the torque Ti resulting from the braking and driving force difference obtained in step S14. The limit value of the transfer torque $T_{TRF}$ can be acquired in advance as a vehicle-specific constant, for example. If the limit value of $T_{TRF}$>Ti, the process proceeds to step S18, and otherwise, the process proceeds to step S19.

<Step S17: Transfer Torque $T_{TRF}$ Maintenance>

The driving force distribution control unit 130 can maintain a locked state in which slipping does not occur due to the torque Ti resulting from the braking and driving force difference in the current transfer torque $T_{TRF}$, and the constraining force of the transfer clutch 40 is maintained (the transfer torque $T_{TRF}$ is maintained). After that, a series of processes ends.

<Step S18: Transfer Torque $T_{TRF}$=Ti>

The driving force distribution control unit 130 controls the constraining force of the transfer clutch 40 such that the transfer torque $T_{TRF}$ matches the torque Ti resulting from the braking and driving force difference. Accordingly, the transfer clutch 40 is maintained in the locked state in which the slipping does not occur. After that, a series of processes ends.

<Step S19: Transfer Torque $T_{TRF}$=Limit Value>

The driving force distribution control unit 130 sets the constraining force (engagement force) of the transfer clutch 40 to a maximum allowable value, and sets the transfer torque $T_{TRF}$ to the limit value. In this case, it is inevitable that the transfer clutch 40 slips due to the torque Ti resulting from the braking and driving force difference exceeding the transfer torque $T_{TRF}$, and it is possible to obtain a maximum effect, obtained by controlling the constraining force of the transfer clutch 40, of suppressing the pitching behavior. After that, a series of processes ends.

<Step S20: Transfer Torque Normal Control>

The driving force distribution control unit 130 performs constraining force (engagement force) control of the transfer clutch 40 at normal based on a previously prepared map value of the front and rear driving force distribution. After that, a series of processes ends.

According to the second embodiment described above, the following effects can be obtained.

(1) The transfer torque $T_{TRF}$ corresponding to the constraining force of the transfer clutch 40 is increased in accordance with the increase in the torque Ti resulting from the braking and driving force difference between the front wheels FW and the rear wheels RW caused by the change in the wheelbase due to the stroke of the suspension device 210, so that a stroke suppression effect of the suspension device 210 due to the internal circulation torque can be ensured, and the pitching behavior of the vehicle body B can be effectively suppressed.

(2) In a region until the transfer torque $T_{TRF}$ reaches the limit value, the pitching behavior can be effectively suppressed by generating, by the transfer torque $T_{TRF}$ (internal circulation torque), a braking and driving force difference equal to or greater than the braking and driving force difference caused by the pitching behavior.

Third Embodiment

Figure 7:
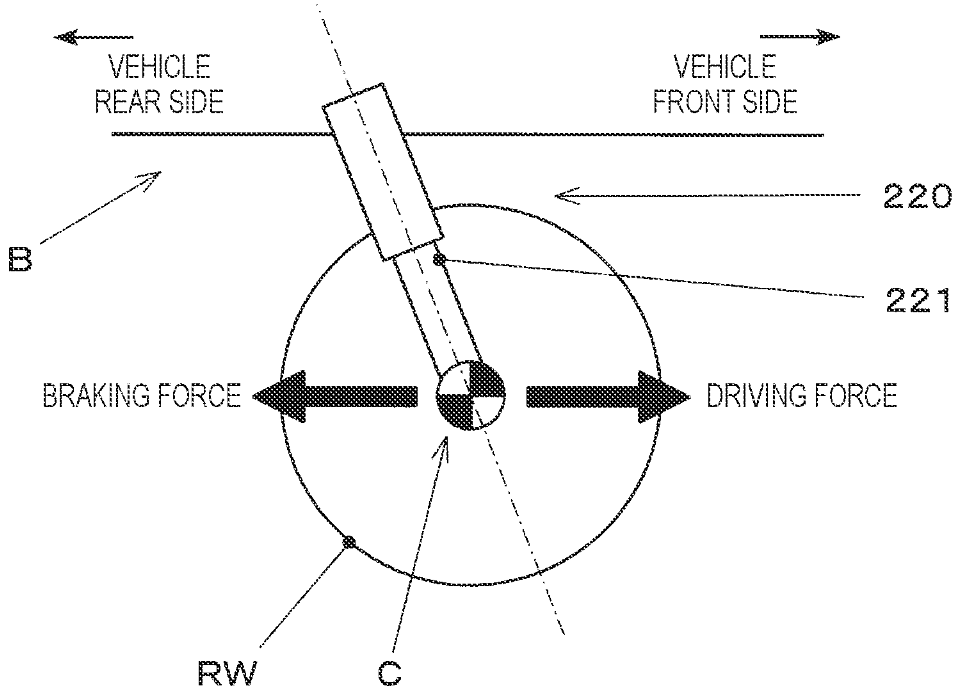
FIG. 7 is a diagram schematically illustrating a configuration of a rear suspension device for a vehicle having a third embodiment of a vehicle behavior control device to which the present disclosure is applied.

Next, a third embodiment of a vehicle behavior control device to which the present disclosure is applied will be described below. The vehicle behavior control device according to the third embodiment is provided in a vehicle having a strut type suspension device 220 described below instead of the trailing arm type suspension devices according to the first and second embodiments. FIG. 7 is a diagram schematically illustrating a configuration of the rear suspension device for the vehicle having the vehicle behavior control device according to the third embodiment.

The rear suspension device 220 has a strut 221. The strut 221 has a hydraulic shock absorber (damper) that generates a damping force according to a stroke speed of the suspension. The strut 221 is disposed such that the stretching and contraction direction (an axial direction of a rod of the shock absorber) is tilted rearward with respect to the vertical direction in a manner that an upper end portion is on the rear side of the vehicle with respect to a lower end portion.

The upper end portion of the strut 221 is attached to the vehicle body B via an elastic mount such as rubber. The lower end portion of the strut 221 is coupled to the hub bearing housing that supports the rear wheels RW. In such a rear suspension device 220 as well, similarly to the rear suspension device 210 according to the first embodiment, when the wheel is stroked in the bound direction (contraction direction), the wheel center C moves backward with respect to the vehicle body B while rising. In addition, when the rear suspension device 220 strokes in a rebound direction (stretching direction), the wheel center C moves forward while descending relative to the vehicle body B.

In the third embodiment described above as well, the constraining force control of the transfer clutch 40 is performed in the same manner as in the first embodiment or the second embodiment described above, so that the same effects as those of the first embodiment and the second embodiment can be obtained.

Fourth Embodiment

Figure 8:
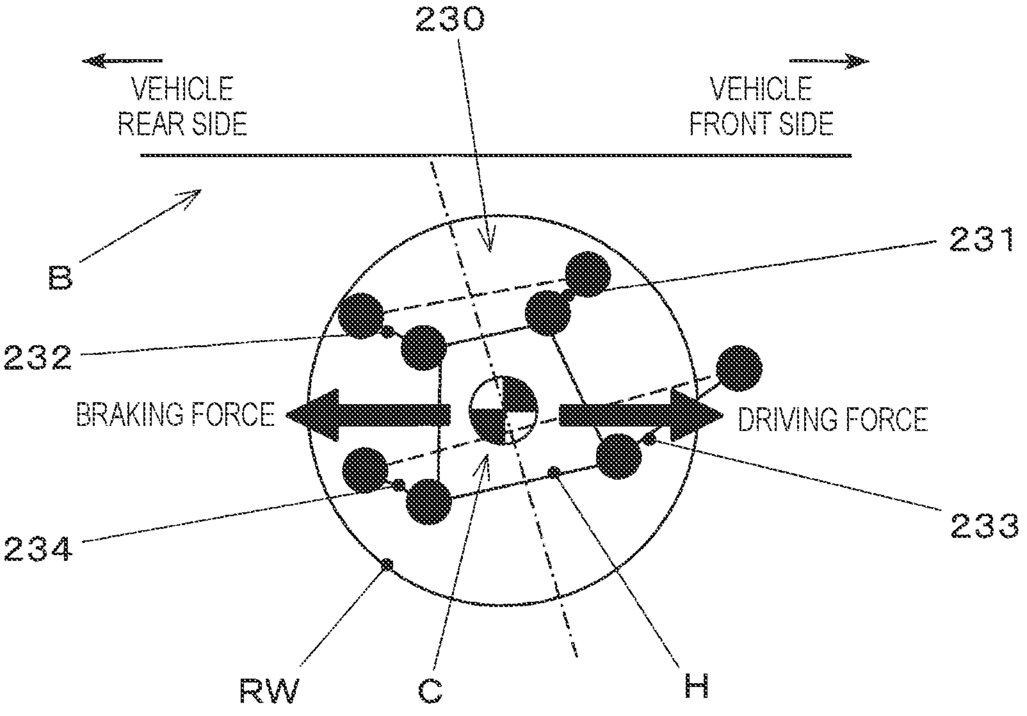
FIG. 8 is a diagram schematically illustrating a configuration of a rear suspension device for a vehicle having a fourth embodiment of a vehicle behavior control device to which the present disclosure is applied.

A fourth embodiment of a vehicle behavior control device to which the present disclosure is applied will be described below. The vehicle behavior control device according to the fourth embodiment is provided in a vehicle having a double wishbone type rear suspension device 230 described below instead of the trailing arm type suspension devices according to the first and second embodiments. FIG. 8 is a diagram schematically illustrating a configuration of the rear suspension device for the vehicle having the vehicle behavior control device according to the fourth embodiment.

The rear suspension device 230 includes a front upper link 231, a rear upper link 232, a front lower link 233, and a rear lower link 234. In each link, an end portion at an inner side in a vehicle width direction is swingably coupled to the vehicle body B, and an end portion at an outer side in the vehicle width direction is swingably coupled to a hub bearing housing H supporting the rear wheel RW.

The front upper link 231 and the rear upper link 232 are disposed above the wheel center C of the rear wheel RW, and are arranged sequentially from the front side of the vehicle. The front lower link 233 and the rear lower link 234 are disposed above the wheel center C of the rear wheel RW, and are arranged sequentially from the front side of the vehicle.

The end portion of the front upper link 231 at a vehicle body B side is positioned higher than the end portion of the rear upper link 232 at the vehicle body B side. The end portion of the front upper link 231 at a housing H side is positioned higher than the end portion of the rear upper link 232 at the housing H side. The end portion of the front lower link 233 at the vehicle body B side is positioned higher than the end portion of the rear lower link 234 at the vehicle body B side. The end portion of the front lower link 233 at the housing H side is positioned higher than the end portion of the rear lower link 234 at the housing H side.

According to such disposing, similar to the rear suspension device 210 according to the first embodiment, the rear suspension device 230 has a geometry in which the wheel center C rises and retreats with respect to the vehicle body B when stroked in the bound direction (contraction direction). In addition, when the rear suspension device 230 strokes in the rebound direction (stretching direction), the wheel center C moves forward while descending relative to the vehicle body B.

In the fourth embodiment described above as well, the constraining force control of the transfer clutch 40 is performed in the same manner as in the first embodiment or the second embodiment described above, so that the same effects as those of the first embodiment and the second embodiment can be obtained.

(Modification)

The present disclosure is not limited to the embodiments described above, and various modifications and changes are possible, which are also within the technical scope of the present disclosure.

(1) The configurations of the vehicle behavior control device, the suspension device, the vehicle, and the like are not limited to the embodiments described above, and can be changed as appropriate. For example, the type of traveling power source, suspension form, and the like can be changed as appropriate.

(2) In each embodiment, the front wheels are directly coupled to the output shaft of the transmission, and the rear wheels receive the driving force from the output shaft of the transmission via the transfer clutch, but a configuration of an AWD system is not limited thereto, and can be changed as appropriate. For example, the rear wheels may be directly coupled to the output shaft of the transmission and the driving force may be provided to the front wheels via the transfer clutch (so-called RWD-based configuration). In addition, the driving force may be transmitted to the front and rear wheels via a mechanical center differential of a bevel gear type, planetary gear type, or the like, and the transfer clutch may constrain the differential rotation between the front and rear shafts.

(3) In each embodiment, the pitch angle of the vehicle body B is detected by using the suspension stroke sensor, but the present disclosure is not limited thereto, and the pitch angle may be detected using another sensor such as an acceleration sensor. The pitch angle may be calculated by numerical calculation using an equation of motion set from specifications of the vehicle.

As described above, according to the present disclosure, it is possible to provide a vehicle behavior control device that suppresses a pitching behavior of a vehicle body with a simple configuration.

According to the above described embodiments, by increasing a constraining force of a front and rear wheel differential rotation constraining member according to occurrence of the pitching behavior of the vehicle body, it is possible to increase an internal circulation torque exchanged between a front wheel driving force transmission mechanism and a rear wheel driving force transmission mechanism. Such an internal circulation torque constrains differential rotation of the front and rear wheels, and acts as a drag force when a wheelbase fluctuates according to a stroke of the suspension device, and thus, the internal circulation torque has an effect of suppressing a suspension stroke and can suppress the pitching behavior of the vehicle body. Such a front and rear wheel differential rotation constraining member is generally provided in a four-wheel drive (AWD) vehicle that drives front and rear wheels, and according to the present disclosure, it is unnecessary to provide new and dedicated hardware in order to suppress a pitching behavior in a vehicle, and it is possible to suppress a pitching behavior with a simple configuration.

According to the above described embodiments, when the pitching behavior of the vehicle is likely to increase due to, for example, a loading state, the pitching behavior can be suppressed to be brought closer to a normal state.

According to the above described embodiments, the constraining force of the front and rear wheel differential rotation constraining member is increased in accordance with the increase in the braking and driving force difference between the front wheels and rear wheels caused by a change in the wheelbase due to the stroke of the suspension device, so that a stroke suppression effect of the suspension device due to the internal circulation torque can be ensured, and the pitching behavior of the vehicle body can be effectively suppressed.

According to the above described embodiments, the pitching behavior can be effectively suppressed by generating, by the internal circulation torque, a braking and driving force difference equal to or greater than the braking and driving force difference caused by the pitching behavior.

According to the above described embodiments, it is possible to optimize the constraining force of the differential rotation constraining portion during turning so as to improve turning performance, and it is possible to suppress an influence on the turning performance due to the application of the present disclosure.

What is claimed is:

1. A vehicle behavior control device provided in a vehicle, the vehicle comprising:

a suspension device supporting a wheel so as to allow a stroke in a bound direction and a rebound direction with respect to a vehicle body, and having a geometry in which a center of the wheel is displaced in a direction in which a wheelbase stretches and contracts due to the stroke; and a front and rear wheel differential rotation constraining member configured to constrain differential rotation between a front wheel driving force transmission mechanism configured to transmit a driving force to front wheels and a rear wheel driving force transmission mechanism configured to transmit a driving force to rear wheels, the vehicle behavior control device comprising:

a front and rear wheel differential rotation constraining control unit configured to increase a constraining force of the front and rear wheel differential rotation constraining member in response to occurrence of a pitching behavior of the vehicle body, wherein the front and rear wheel differential rotation constraining control unit increases the constraining force of the front and rear wheel differential rotation constraining member to be greater than a constraining force in a normal control state in which a magnitude of the pitching behavior with respect to a predetermined input to the vehicle body is not greater than a predetermined threshold, when the magnitude of the pitching behavior with respect to the predetermined input to the vehicle body is greater than the predetermined threshold.

2. A vehicle behavior control device provided in a vehicle, the vehicle comprising:

a suspension device supporting a wheel so as to allow a stroke in a bound direction and a rebound direction with respect to a vehicle body, and having a geometry in which a center of the wheel is displaced in a direction in which a wheelbase stretches and contracts due to the stroke; and a front and rear wheel differential rotation constraining member configured to constrain differential rotation between a front wheel driving force transmission mechanism configured to transmit a driving force to front wheels and a rear wheel driving force transmission mechanism configured to transmit a driving force to rear wheels, the vehicle behavior control device comprising:

a front and rear wheel differential rotation constraining control unit configured to increase a constraining force of the front and rear wheel differential rotation constraining member in response to occurrence of a pitching behavior of the vehicle body, wherein the vehicle behavior control device further comprises a straight traveling state determination unit configured to determine a straight traveling state of the vehicle, wherein when the straight traveling state is determined, the front and rear wheel differential rotation constraining control unit increases the constraining force of the front and rear wheel differential rotation constraining member, and when the straight traveling state is not determined, the front and rear wheel differential rotation constraining control unit sets a turning constraining force depending on a turning state of the vehicle.

3. A vehicle behavior control device provided in a vehicle, the vehicle comprising:

a suspension device supporting a wheel so as to allow a stroke in a bound direction and a rebound direction with respect to a vehicle body, and having a geometry in which a center of the wheel is displaced in a direction in which a wheelbase stretches and contracts depending on the stroke; and a front and rear wheel differential rotation constraining member configured to constrain differential rotation between a front wheel driving force transmission mechanism configured to transmit a driving force to front wheels and a rear wheel driving force transmission mechanism configured to transmit a driving force to rear wheels, the vehicle behavior control device comprising:

a braking and driving force difference output member configured to output a braking and driving force difference between the front wheels and the rear wheels depending on a pitching behavior of the vehicle body; and a front and rear wheel differential rotation constraining control unit configured to increase a constraining force of the front and rear wheel differential rotation constraining member in accordance with an increase in the braking and driving force difference.

4. The vehicle behavior control device according to claim 3, wherein the front and rear wheel differential rotation constraining control unit controls the constraining force such that a braking and driving force difference generated between the front wheels and the rear wheels according to a torque transmitted by the front and rear wheel differential rotation constraining member is equal to or greater than the braking and driving force difference between the front wheels and the rear wheels depending on the pitching behavior of the vehicle body.

5. The vehicle behavior control device according to claim 3, the vehicle behavior control device further comprising a straight traveling state determination unit configured to determine a straight traveling state of the vehicle, wherein when the straight traveling state is determined, the front and rear wheel differential rotation constraining control unit increases the constraining force of the front and rear wheel differential rotation constraining member, and when the straight traveling state is not determined, the front and rear wheel differential rotation constraining control unit sets a turning constraining force depending on a turning state of the vehicle.

* * * * *